United States Patent [19]

Pickering et al.

[11] Patent Number: 4,772,829
[45] Date of Patent: Sep. 20, 1988

[54] APPARATUS FOR INTERACTIVELY ACCELERATING AN ELECTRIC DRIVE VEHICLE

[75] Inventors: William Pickering, University Heights; Wayne T. Wiblin, Ashtabula, both of Ohio

[73] Assignee: Caterpillar Industrial Inc., Mentor, Ohio

[21] Appl. No.: 52,303

[22] Filed: May 21, 1987

[51] Int. Cl.$^4$ .............................................. H02P 7/28
[52] U.S. Cl. ................................ 318/139; 318/345 B; 318/392
[58] Field of Search ......................... 318/139, 255–259, 318/384, 341, 345 A, 345 B, 385, 391, 392, 599

[56] References Cited

U.S. PATENT DOCUMENTS

| | | | |
|---|---|---|---|
| 3,213,343 | 10/1965 | Sheheen | 318/258 X |
| 3,349,309 | 10/1967 | Dannettell | 318/139 X |
| 3,710,216 | 1/1973 | Smith | 318/373 |
| 4,057,752 | 11/1977 | Artrip et al. | 318/345 B |
| 4,069,445 | 1/1978 | Klimo | 318/139 |
| 4,081,725 | 3/1978 | Schmidt et al. | 318/139 |
| 4,508,999 | 4/1985 | Melocik et al. | 318/331 |

Primary Examiner—Bentsu Ro
Attorney, Agent, or Firm—Terry D. Morgan

[57] ABSTRACT

An apparatus for controlling the supply of power to an electric drive motor normally controls the duty cycle of a power switching element to produce a variety of vehicle speeds. The apparatus typically controls the rate of change of the duty cycle to provide smooth vehicle operation. During periods of extended high speed, high load operation the apparatus bypasses the power switching element and connects the vehicle battery directly to the drive motor via a contactor. Under normal operating conditions the bypass contactor is energized after a relatively short preselected delay; however, where the vehicle is heavily loaded, such that current limiting of the power switching element exists, the apparatus interactively delays energization of the bypass contactor to allow the vehicle sufficient time to accelerate to a higher speed. Such a control system advantageously reduces drive line shock and jerky operation of the vehicle, as well as, excessive sparking at the contactor.

4 Claims, 3 Drawing Sheets

APPARATUS FOR INTERACTIVELY ACCELERATING AN ELECTRIC DRIVE VEHICLE

TECHNICAL FIELD

This invention relates generally to an apparatus for controlling the operation of a bypass contactor of an electric drive vehicle and more particularly to an apparatus for interactively delaying energization of the bypass contactor in response to the electric drive motor being current limited.

BACKGROUND ART

In the field of electric drive vehicles, motor speed control circuits are typically of the chopper or pulse control variety. However, during periods of high speed operation it is advantageous to employ a bypass contactor to shunt the chopper circuit and provide full battery voltage to the electric motor. This control scheme is well known in the art and serves the useful purpose of protecting the chopper circuit from overheating and overcurrent conditions while providing maximum acceleration and velocity.

Typically, these controls monitor accelerator pedal position and energize the bypass contactor after the pedal has been held at its maximum position for a preselected duration of time (e.g. 2 seconds). The delay in operation of the contactor allows the vehicle to smoothly accelerate to a speed relatively near the maximum velocity before directly connecting battery voltage to the motor. Thus, preventing sparking and degradation of the contactor tips and large inrush currents to the drive motor causing jerky operation.

The acceleration rate of electric drive vehicles is dependant upon a number of conditions, including weight of the vehicle, load, current limitations of the chopper circuit, and electric drive motor characteristics. Accordingly, control schemes which force the bypass contactor to be energized after a set period of time cannot optimize acceleration, reduce contactor tip degradation, or prevent large inrush currents to the drive motor. For example, if the delay period is selected to optimize acceleration of an unloaded vehicle, then the delay period will be too short for a loaded vehicle. The contactor will be energized at a relatively low speed resulting in "jerky" operation, sparking, and a large inrush current. Conversely, a delay period that is selected to optimize acceleration of a loaded vehicle will be too long when the vehicle is operated unloaded. The vehicle will quickly accelerate to near maximum velocity and remain at that speed until the time period elapses and the bypass contactor is energized. While the previously mentioned problems are avoided, vehicle performance is less than optimal and the chopper circuit is susceptible to overheating and overcurrent during this extended operation.

The present invention is directed to overcoming one or more of the problems as set forth above.

DISCLOSURE OF THE INVENTION

In one aspect of the present invention, an apparatus is provided for use on an electric drive vehicle having an electric motor controllably energizable via a power switching element to selectively bypass the power switching element during a preselected mode of operation. The apparatus is comprised of a bypass contactor connected in parallel with the power switching element, means for detecting motor current and delivering a current limit signal in response to the detected current being greater than a preselected setpoint, means for controllably increasing the duty cycle of the power switching element at a preselected rate, means for closing the bypass contactor in response to the duty cycle of the power switching element reaching a preselected maximum rate, and means for altering the rate of increase of the power switching element duty cycle in response to receiving the current limit signal.

Bypass control circuits have heretofore relied upon either a fixed period of time elapsing or the chopper circuit duty cycle reaching a preselected duty cycle before energizing the bypass contactor. Such circuits have suffered from either jerky operation and worn contacts or a total lack of operation during severe loading and current limiting.

BRIEF DESCRIPTION OF THE DRAWINGS

For a better understanding of the present invention, reference may be had to the accompanying drawings, in which.

BEST MODE FOR CARRYING OUT THE INVENTION

Figure 1:
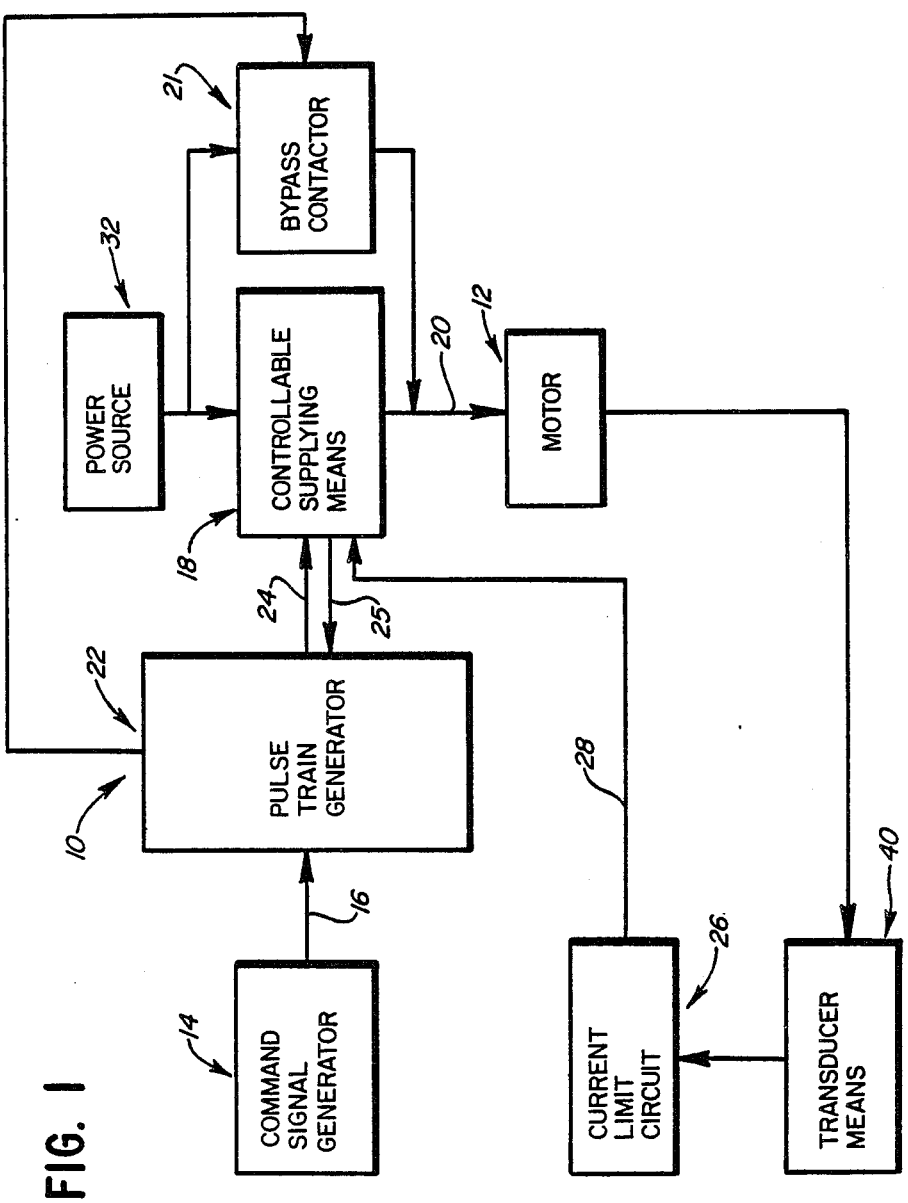
FIG. 1 illustrates a block diagram of one embodiment of the present invention.

Referring now to the drawings, wherein a preferred embodiment of the present apparatus 10 is shown, FIG. 1 illustrates an apparatus 10 for controlling the supply of power to a motor 12. The apparatus 10 is designed to perform the function of motor speed control and motor current limit control. Consequently, the apparatus 10 includes a power source 32, and a means 14 for generating a plurality of different motor speed command signals on an output line 16, each in response to a respective desired motor speed. The apparatus 10 also includes a controllable supplying means 18, coupled to the motor 12 via a line 20, for delivering motor speed control signals to the motor 12, and responsively coupling power to the motor 12, and a first means 22 for receiving the command signals, generating respective motor speed control signals in response to the command signals, and delivering the control signals to the supplying means 18 via a line 24 to couple and decouple power to the motor 12. A bypass contactor 21 is also provided to shunt the supplying means 18 and connect the power source 32 directly to the motor 12 during high speed, high power operation. The first means 22 also acts to control the bypass contactor 21. Operation of the bypass contactor 21 normally occurs a preselected duration of time after the operator requests full speed operation via the command signal generator 14.

The apparatus 10 further includes a first transducer means 40 for supplying a current signal in response to the magnitude of current flowing through the motor 12 and a second means 26 for receiving the current signal, generating a blocking signal on a line 28 in response to the current signal exceeding a preselected value, and delivering the blocking signal to the controllable supplying means 18 to selectively decouple power to the motor 12 in response to the control signal, with the second means 26 being independent of the first means 22. The line 28 bypasses the means 22 and acts, in addition to the line 24, as a control input to the supplying means 18. Therefore, the supplying means 18 is controlled by the second means 26 for decoupling power to the motor 12 independently or irrespective of the first means 22, as will be further described. Thus, the control produced by the second means 26 will continue to operate should the first means 22 malfunction or otherwise fail by, for example, calling for unwanted maximum power and corresponding motor speed. Similarly, operation of the bypass contactor 21 is altered in response to receiving a signal from the first transducer means 40 via a line 25.

Figure 2:
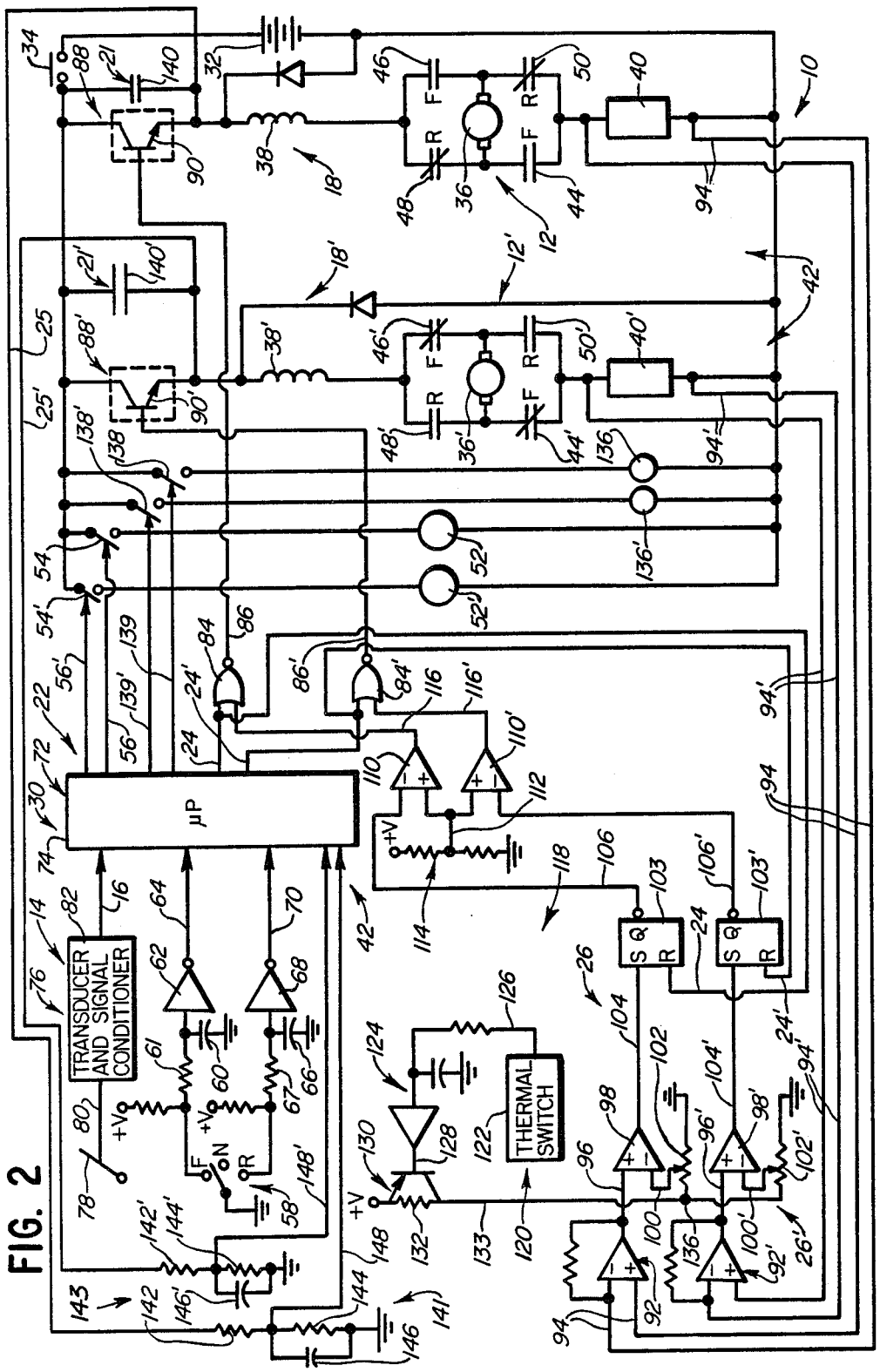
FIG. 2 illustrates a schematic illustration of an overall motor control system incorporating the present invention.

FIG. 2 shows the apparatus 10, including the motor speed command signal generating means 14, the controllable supplying means 18, the bypass contactor 21, the first means 22, the transducer means 40, and the second means 26, as part of an overall apparatus or motor control system shown generally as 30. Since the principles of the present invention can be applied to simultaneous control of a plurality of motors, a second motor 12' is shown for exemplary purposes. The second motor 12' is similar to the first motor 12 and necessarily includes substantially identical circuitry indicated as prime element numbers and will not be discussed in great detail hereafter except where required for a proper understanding of the apparatus 10.

The control system 30 includes the power source 32, such as a vehicle batter $V_{bat}$, that supplies power to the motors 12 and 12' through a normally open line contact 34. The line contact 34 is typically energized upon actuation of a vehicle key switch (not shown) and provides power to the electric drive system. The motor 12 includes an armature 36 and a field winding 38 that are in series connection with a shunt 40.

A means 42 for controlling the direction of energization of the motor 12 is part of the control system 30 and includes normally open forward contacts 44 and 46, together with normally closed reverse contacts 48 and 50. A directional contactor coil 52, which controls the state of the contacts 44,46,48,50, and an on-off switch 54, such as a transistor which is controlled by the output of the first means 22 on a line 56, are in series connection with the power source 32. When the switch 54 is closed, the coil 52 is energized to change the state of the contacts 44,46,48,50 from that shown. When the switch 54 is opened, the coil 52 is deenergized to return the contacts 44,46,48,50 to the normal state shown.

The means 42 further includes a directional control switch 58 having a forward position F, a neutral position N and a reverse position R. When the switch 58 is in the neutral position, +V is delivered through a resistor 61 to an inverter 62 such that the output of the inverter 62 on a line 64 is a logic 0. Similarly, +V is also provided through a resistor 67 to an inverter 68 and the output of an inverter 68 on a line 70 is a logic 0. A pair of capacitors 60,66 are provided for noise immunity to prevent spurious switching of the inverters 62,68. When the directional control switch 58 is switched to the forward position F, the input of the inverter 62 is pulled to ground so that the output on the line 64 from the inverter 62 is a logic 1. Similarly, when the directional control switch 58 is switched to the reverse position R, the inverter 68 input is pulled to ground and the output on the line 70 from the inverter 68 is a logic 1.

The first means 22 includes a data processor 72 which can be, for example, a programmable microprocessor 74 that performs a number of control functions. Thus, under software control, the microprocessor 74 responds to the logic 1 on the line 64 by closing or turning on the switch 54, energizing the coil 52, changing the state of the contacts 44,46,48,50, and opening the switch 54' to ensure that the state of the contacts 44',46',48',50' is as illustrated. Therefore, the forward contacts 44,46 are closed, the reverse contacts 48,50 are opened, the forward contacts 44',46' remain closed, and the motors 12 and 12' can be energized in the same, i.e., forward direction. Under software control, the microprocessor 74 responds to the logic 1 on the line 70 by closing or turning on the switch 54', energizing the coil 52', changing the state of the contacts 44',46',48',50', and opening the switch 54 to provide the illustrated state of the contacts 44,46,48,50. Therefore, the reverse contacts 48',50' are closed, the forward contacts 44',46' are opened, the reverse contacts 48,50 are closed and the motors 12 and 12' can be energized in the same, i.e., reverse direction.

The motor speed command signal generating means 14 includes a means 76 for generating digital numbers on the output line 16 representing the command speed data. For example, the numbers are 4-bit digital numbers ranging from 0000 to 1111. Each digital number in the range 0000-1111 is a different motor speed command signal for the motors 12 and 12' For example, the number 0000 commands zero speed, the number 1011 commands half speed and the number 1111 commands 90% of full or maximum speed. Under software control, the microprocessor 74 responds to the digital numbers on the line 16 by outputting preselected pulse trains on the lines 24 and 24'. Thus, in the present example, since there are sixteen digital numbers or command speeds in the range 0000-1111, there are sixteen different preselected motor speed control signals or pulse trains that are produced on the lines 24 and 24' to rotate the motors 12 and 12' at sixteen different speeds. The sixteen different pulse trains are different in duty factor or proportion of pulse "on-time" to pulse "off-time". The range of digital numbers from 0000 to 1111 in the binary coded decimal format (BCD) is used only for convenient illustration and could be any suitably coded binary representation, for example a gray code, having a number of bits consistent with the desired precision.

As one example, the generating means 76 is coupled to an accelerator pedal 78 via a linkage 80. The generating means 76 includes a transducer and signal conditioning circuit 82 which converts positional information of the accelerator pedal 78 to any one of the digital numbers 0000-1111 on the line 16.

In operation, when the accelerator pedal 78 is fully released or not depressed, the generating means 76 responds by outputting the digital number 0000 on the line 16. The microprocessor 74 responds by not producing any control signal or pulse train on the lines 24 and 24', and the motors 12 and 12' are shut off. When the accelerator pedal 78 is depressed to, for example, a half-speed position, the generating means 76 outputs the number 1011 on the line 16, the microprocessor 74 responds to the number 1011 on the line 16 by outputting a preselected pulse train on the lines 24 and 24' to operate the motors 12 and 12' at half speed. When the accelerator pedal 78 is depressed to, for example, a full speed position, the microprocessor 74 responds to the number 1111 on the line 16 by outputting a preselected pulse train on the lines 24 and 24' to operate the motors 12 and 12' at full pulsed speed. The 90% pulse train is not immediately delivered, but is delayed to allow smooth acceleration of the vehicle. Table 1 shows one example of a suitable relationship between the accelerator pedal 78 position, the corresponding motor speed command signals, and the resulting pulse train duty factors.

TABLE 1

| Accelerator Pedal Position (% of Maximum) | Motor Speed Command Signals | Pulse Train Duty Factors (%) |
|---|---|---|
| 0.00 | 0000 | 0.00 |
| 6.67 | 0001 | 4.50 |
| 13.33 | 0010 | 9.00 |
| 20.00 | 0011 | 13.50 |
| 26.67 | 0100 | 18.00 |
| 33.33 | 0101 | 23.00 |
| 40.00 | 0110 | 27.00 |
| 46.67 | 0111 | 32.00 |
| 53.33 | 1000 | 37.00 |
| 60.00 | 1001 | 41.00 |
| 66.67 | 1010 | 46.00 |
| 73.33 | 1011 | 50.00 |
| 80.00 | 1101 | 60.00 |
| 86.67 | 1101 | 70.00 |
| 93.33 | 1110 | 80.00 |
| 100.00 | 1111 | 90.00 |

The supplying means 18 includes a two-input NOR gate 84 having a first input connected to the line 24 and an output coupled via a line 86 to an on-off power switching element 88 which has a power transistor 90 connected intermediate the power source 32 and the motor 12. A two-input NOR gate 84' has a first input connected to the line 24' and an output coupled via a line 86' to an on-off power coupling switch 88' which has a power transistor 90' in series with the motor 12'. The gates 84 and 84' pass or do not pass the pulse trains on the respective lines 24 and 24' to the lines 86 and 86' in response to the state (logic 0 or logic 1) of the respective second inputs, as described below.

Assume the gates 84 and 84' are enabled to pass the respective pulse trains on the lines 24 and 24'. In response to the pulses on the lines 24 and 24' being high or logic 1, the outputs of the gates 84 and 84' on respective lines 86 and 86' are low or logic 0. As can be seen, the means 18 and 18' respond by turning off the transistors 90 and 90' and deenergizing the motors 12 and 12'. In response to the pulses on the lines 24 and 24' being low or logic 0, the outputs of the gates 84 and 84' on respective lines 86 and 86' are high or logic 1. The means 18 and 18' respond by turning on the transistors 90 and 90' to energize the motors 12 and 12'.

As previously mentioned, the second means 26 decouples power from the motors 12 and 12' in order to limit motor current to a maximum value. The means 26 includes a differential amplifier 92 having inputs 94 coupled across the shunt 40 to monitor or sense current flow through the armature 36 of the motor 12. The output voltage signal of the amplifier 92 on a line 96 is directly proportional to the armature current. An operational amplifier or comparator 98 has one input (+) coupled to the line 96 for receiving the voltage signal. Another input (−) of the comparator 98 receives a reference voltage signal on a line 100 via the output of a potentiometer 102. The reference voltage signal on the line 100 is one of two levels for reasons described below.

A latch 103 has a set input S connected to the output of the comparator 98 via a line 104. A reset input R of the latch 103 is coupled to the line 24 carrying the pulse train output of the microprocessor 74 and is reset with each logic 1 or high pulse of the pulse train. The latch 103 has an output Q coupled to a line 106, which is one input to a comparator 110. The other input to the comparator 110 receives a reference voltage signal on a line 112 from the output of a voltage divider 114. The output of the comparator 110 is coupled to a line 116 which is the other input to the gate 84.

The second means 26' has corresponding components indicated by like reference numerals for limiting current through the motor 12'. Thus, there is shown, for example, a differential amplifier 92', a comparator 98', a latch 103', and a comparator 110'.

In the operation of the second means 26, assume that the reference voltage signal on the line 100 is at a value corresponding to the preselected maximum allowable motor current. If the current through the armature 36 of the motor 12 does not exceed the maximum value, the signal on the line 96 from the differential amplifier 92 is lower than the signal on the line 100, resulting in a logic 0 on the line 104. This logic 0 is stored in the latch 103 and produces the logic 1 on the line 106 that is supplied as one input to the comparator 110. Note that each pulse of the pulse train on the line 24 resets the latch 103, but since a logic 0 resides continually on the line 104 as long as the maximum current has not been reached, the latch 103 remains set to provide the logic 1 on the line 106. Since the other reference voltage signal input on the line 112 to the comparator 110 is lower than the logic 1 on the line 106, the output of the comparator 110 is a logic 0 on the line 116 which constitutes one input to the gate 84. Therefore, the output of the gate 84 on the line 86 follows the waveform of the pulse train on the line 24 and biases the transistor 90 on and off. A low pulse or logic 0 on the line 24 ultimately turns on the transistor 90 and a high pulse or logic 1 on the line 24 ultimately turns off the transistor 90.

Assume now that the current through the armature 36 of the motor 12 exceeds the preselected maximum value, and the signal on the line 96 exceeds the signal on the line 100, resulting in a logic 1 being output on the line 104. In response, the latch 103 stores this logic 1 to provide a logic 0 on the line 106 as an input to the comparator 110. Since the other reference voltage signal input to the comparator 110 on the line 112 is now higher than this logic 0, the output of the comparator 110 on the line 116 is logic 1. Therefore, the output of the gate 84 on the line 86 is continually a logic 0, irrespective of the pulse train on the line 24, and turns off the transistor 90. Thus, in response to the current in the motor armature 36 exceeding the maximum value, as selected by the reference voltage signal on the line 100, the transistor 90 is turned off to stop the supply of current to the motor 12 until the current falls below this maximum value. Thus, the output of the comparator 110 on the line 116 is the blocking signal supplied to the gate 84 for controllably modifying the pulse trains delivered by the first means 22.

It can be appreciated that the other components of the second means 26' function in the same manner to monitor and control the current through the armature 36' of the motor 12'. Therefore, the output of the comparator 110' enables or disables the gate 84' to pass or not pass the pulse trains on the line 24' to the line 86'.

As previously mentioned, the latch 103 is reset with the pulses of the pulse trains on the line 24. This resetting is performed since it is desirable to check the current limit condition often, such as with each pulse. Should the first means 22 malfunction by, for example, outputting the maximum speed pulse train on the line 24 irrespective of the value of the digital number on the line 16, and if the preselected maximum motor current is reached, the second means 26 will operate to limit the motor current in the presence of the malfunction.

Another condition, other than a motor overcurrent condition, that can occur and make it desirable to limit current through the motors 12 and 12' is an undesirable thermal condition. That is, motor current flow should be limited in the event of overheating the power switching element 88 including the transistor 90 or the switching element 88' including the transistor 90'. Consequently, a means 118 for protecting the elements 88 or 88' against overheating can advantageously be added to the second means 26 and 26'.

The means 118 includes a transducer means 120, such as a thermal switch 122, for supplying a temperature signal in response to the temperature of the supplying means 18 exceeding a preselected value, and means 26 for generating the blocking signal in response to receiving the temperature signal.

The thermal switch 122 is located adjacent the supplying means 18, for example, on a heat sink associated with the transistors 90 and 90'. A signal conditioning circuit 124 conditions an output signal on a line 126 from the transducer means 120 to produce the conditioned signal on an output line 128. A transistor 130, having a resistor 132 coupled across its emitter and collector, is biased in response to the conditioned signal on the line 128. The collector of the transistor 130 is connected to the potentiometers 102 and 102' via a line 133.

In operation, if the power switching elements 88 and 88' have not overheated, the output of the thermal switch 122 on the line 126 is at logic 0, which is coupled via the conditioning circuit 124 onto the line 128 for holding the transistor 130 on. In response, a voltage +V is coupled through the transistor 130, bypassing the resistor 132, onto the line 133 and then to the potentiometers 102 and 102', setting the reference voltage signal on the lines 100 and 100' to the preselected value for current limit control of current through the armatures 36 and 36', as previously described.

However, should the switch 88 or 88' overheat, a logic 1 is produced on the line 126 by the thermal switch 122. The logic 1 is conditioned by the conditioning circuit 124 and output on the line 128 to bias off the transistor 130. In response, a voltage +V is coupled through the resistor 132 onto the line 133. A voltage drop occurs across the resistor 132. This results in a lower voltage on the line 133 and a lower reference voltage signal on the lines 100 and 100' than that resulting from transistor 130 being on. This lower reference voltage signal lowers the setting for the current limit and results in a lowered allowable maximum current flow through the motors 12 and 12'. The reduced current flow will allow the overheated switch 88 or 88' to cool.

Additionally, overcurrent conditions occur during normal operation of the vehicle. For example, a loaded truck will likely become current limited when accelerated from low to high speed. Further, a heavily loaded truck can become current limited at, as low as, a 60% duty cycle control signal. A vehicle ascending an inclined ramp may also experience current limiting. During these high load conditions, the motor 12 can easily draw sufficient current to actuate current limiting.

During high speed, high load operation it has been found advantageous to bypass the power transistor 90 via a bypass contactor 140 connected in parallel with the transistor 90. A contactor coil 136, which controls the state of the contacts 140, and an on-off switch 138, such as a transistor which is controlled by the output of the first means 22 on a line 139, are in series connection with the power source 32. When the switch 138 is closed, the coil 136 is energized to change the state of the contacts 140 from that shown. When the switch 138 is opened, the coil 52 is deenergized to return the contacts 140 to the normal state shown. Operation of the normally open bypass contactor 140 is effected by the microprocessor 74 under software control.

The power transistor 90' may be similarly shunted by bypass contactor 140' through energization of the contactor coil 136'. The parameters used in controlling operation of the bypass contactors 140,140' will be discussed fully in conjunction with the flowchart of FIG. 3.

Means 143 detects the state of energization of the power switching element 88 to determine if a current limit condition exists. A voltage divider circuit 141 is connected to the emitter of the power transistor 90. The circuit includes a pair of resistors 142,144 serially connected between the emitter and system ground with a line 148 interconnecting the union of the resistors 142,144 to the means 22. Additionally a capacitor 146 is placed in parallel with the resistor 144 for proper filtering of the signals applied to the line 148. The values of the resistors 142,144 are selected, such that the voltage developed on line 148 is logically "high" when the power transistor 90 is biased on and logically "low" when the power transistor 90 is biased off. Such an arrangement acts as a feedback for the control signals delivered on the line 24. Since the microprocessor "knows" when a logically "low" signal has been delivered on the line 24, it "knows" when the power transistor should be biased on. Accordingly, by monitoring the voltage on line 148 during the periods when the line 24 has been pulled "low" the microprocessor 74 detects a current limit condition in response to line 148 being low. Operation of the software to alter performance of the bypass contactor 140 is fully explained in conjunction with FIG. 3.

Alternatively, the lines 106,106' could also be monitored by the microprocessor 74 to detect a current limit condition. However, in the instant apparatus the line 148 is also present for detecting short circuiting of the power transistor 90. By monitoring the line 148 during the period of time when the power transistor 90 should be biased off, the microprocessor 74 detects a short circuit in response to detecting a logically "high" signal on the line 148. Consequently, since the voltage divider circuit is necessary for short circuit detection, it can be advantageously employed for the dual function of detecting overcurrent without adding additional lines or using additional input ports.

Figure 3:
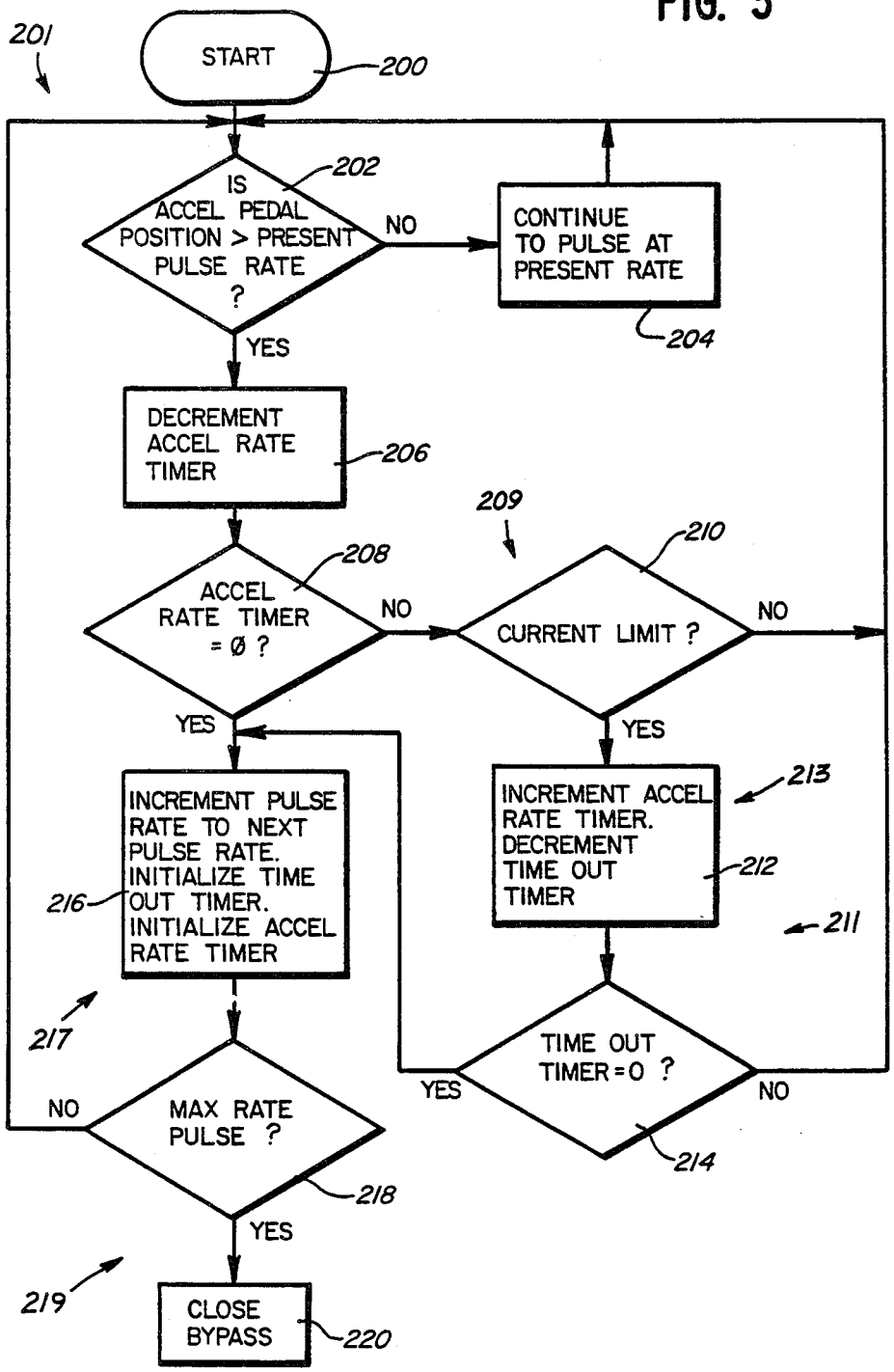
FIG. 3 illustrates a flowchart representation of one embodiment of the software of the present invention.

FIG. 3 is a flowchart of a computer program suitable for controlling the apparatus 10. Only the software routines required to implement one embodiment of the present invention are described herein. Sufficient detail is presented to allow one skilled in computer programming to write the required program to implement the flowchart for any common microprocessor, for example, the microprocessor produced by MOSTEK Corporation of Carrollton, Tex. and designated by the part number 3870. Upon beginning the flowchart of FIG. 3 at the block 200 labeled START, program control progresses through the following sequence and generally includes means 201 for controllably increasing the duty cycle of the power switching element 88 at a preselected rate:

In decision block 202, the microprocessor 74 inputs the information that is received on the line 16 relating to the accelerator pedal 78 position or speed demand. This signal is compared to the present pulse rate to determine if the operator is requesting acceleration. If the vehicle is in steadystate operation, control passes to block 204 where the pulse rate is maintained at its present value. Thereafter control continues to loop through the blocks 202,204 until the operator attempts to accelerate by depressing the accelerator pedal 78. Once acceleration has been requested, control passes to block 206 where an acceleration rate timer is decremented on each pass through the control loop. During each pass decision block 208 routes control to decision block 210 as long as the acceleration timer has not reached zero. Thus, if the operator is requesting acceleration, the pulse rate is allowed to remain at a preselected rate for only a preselected duration of time determined by the acceleration rate timer. Referring to Table 2, it can be seen that the acceleration rate timer is varied according to the present pulse train duty factor. For example, at 60%-80% duty factors the acceleration rate timer is set to 200 msec for each factor and at 90% the timer is limited to 100 msec. Below 50% the entire time delay is limited to a total of 250 msec. Therefore, the vehicle will normally accelerate from 0% to 100% duty factor in less than 1 second.

However, during current limiting the acceleration rate timer is overridden by a time out timer which is normally significantly longer than the acceleration rate timer. The longer period of time allows the vehicle to accelerate further without increasing the pulse rate, thereby delaying ultimate energization of the bypass contactor 21,21'. Means 211 alters the rate of increase of the power switching element 88 duty cycle in response to receiving the current limit signal. The means 211 includes a means 213 for decreasing the rate of change of the duty cycle in response to receiving the current limit signal. In decision block 210, the microprocessor 74 inputs the information that is received on the lines 148,148' relating to the voltage level of the emitters of the power transistors 90,90'. If the voltage level the lines 148,148' is "low" while the output signal on the lines 24,24' is "low", the control routine assumes that current limiting has biased the power transistors 90,90' off. In the event of current limiting, control passes to block 212 where the time out timer is decremented and the acceleration rate timer is incremented. Incrementing the acceleration rate timer offsets decrementing the timer in the block 206. In this manner, the acceleration rate timer is maintained at its maximum value for the entire period of the time out timer. Accordingly, if the vehicle accelerates sufficiently to overcome current limiting during the time out timer period, control reverts back to the acceleration rate timer allowing the vehicle a short period of time to continue accelerating before energizing the bypass contactor. For example, a vehicle may become current limited while ascending a ramp, but will revert back to normal operation after reaching level ground.

In decision block 214 the time out timer is compared to zero and if not, control returns to the start. Conversely, if current limiting does not exist, the decision block 210 bypasses the blocks 212,214 and returns control to the start. Referring again to Table 2, the relationship between the time out timer setting and the pulse train duty factor is shown. Below the 50% duty factor the time out timer remains unchanged from the acceleration rate timer. This is generally because current limiting ordinarily does not occur in this range of duty factors. However, at 60%-80% the time allowed for acceleration increases to 900 msec for each factor and at 90% the time out timer is set to 100 msec. Accordingly, the time allowed prior to energizing the bypass contactor 140 approximately triples to about 3 seconds. It should be recognized that the actual delay periods shown herein are for illustrative purposes only and will vary according to the vehicle and application.

Control will continue to pass through the control loop until either the acceleration rate or time out timer is decremented to zero. At that time control passes from the decision blocks 208,214 to block 216 where the pulse rate is incremented to the next higher pulse rate and both the time out and acceleration rate timers are set to their desired values. Each time one of the timers times out the process will repeat and control will return to the start, until the maximum pulse rate has been reached. Means 219 closes the bypass contactor 140 in response to the duty cycle of the power switching element 88 reaching a preselected maximum rate. Once the maximum pulse rate has been attained, decision block 218 passes control to block 220 where the bypass contactor 21,21' is closed. At this time the process is complete, but will be repeated each time the operator attempts to accelerate to the maximum velocity.

TABLE 2

| Pulse Train Duty factors (%) | Acceleration Rate Timer (msec) | Time Out Timer (msec) |
| --- | --- | --- |
| 0-50 | 250(total) | 250(total) |
| 60.00 | 200 | 900 |
| 70.00 | 200 | 900 |
| 80.00 | 200 | 900 |
| 90.00 | 100 | 100 |

In block 216, the microprocessor 74 inputs the information received on the lines 64,70 relating to the direction of desired motor rotation. A means 217 detects the direction of energization and reduces the rate of increase of the duty cycle in response to the motor 12 being energized for reverse rotation. The direction of vehicle travel is important in determining the optimum time delay prior to bypass contactor energization. Electric lift trucks typically employ front wheel drive with forward mounted forks and rear wheel steering. Accordingly, during forward operation, a sudden acceleration results in weight transfer to the rear wheels which only enhances steering. Alternatively, during reverse operation, a sudden acceleration transfers weight to the front drive wheels thereby reducing weight on the steering wheels. It is possible that an improperly operated and overloaded vehicle could have sufficient weight transfer to reduce steering responsiveness. Thus, to mitigate this possibility the acceleration rate timer and time out timer are substantially longer during reverse operation.

INDUSTRIAL APPLICABILITY

In the overall operation of the vehicle and the vehicle control system, assume, for example, that the directional control switch 58 is in the forward position F and that the accelerator pedal 78 is at a half-speed position. The microprocessor 74 has received the logic 1 data signal on the line 64 and the digital number 1011 on the line 16. Consequently, the microprocessor 74 has closed the switch 54 to energize the coil 52 and is producing the pulse train on the lines 24 and 24' corresponding to half-speed. As a result, the motors 12 and 12' are being energized to move the vehicle in the forward direction at half speed.

Then, for example, should the accelerator pedal 78 be released to a quarter speed position or depressed to a full speed position, the microprocessor 74 will respond to the respective digital numbers on the line 16 to generate the corresponding pulse trains on the lines 24 and 24', thereby energizing the motors 12 and 12' to drive the vehicle at quarter speed or full speed.

A similar speed and directional control will occur should the directional control switch 58 be in the reverse position R and the accelerator pedal 78 be depressed to various positions.

In response to the current through the motors 12 or 12' exceeding a preselected maximum value, the second means 26 and 26' will limit this current, irrespective of the magnitude of current or power that would otherwise be coupled to the motor 12 or 12' due to the pulse train on respective lines 24 and 24'. The maximum value can be a relatively high or low value depending on whether the power switching elements 88 or 88' overheat, as determined by the means 118.

Current limiting can have significant impact on the smooth operation of the vehicle, in that, if current limiting occurs and the control continues incrementing through the pulse rates until the bypass contactor is closed, the differential between the applied voltage and battery voltage may be large. Accordingly, closing the bypass contactors 140,140' when the effective pulse rate is at, for example, 60% will produce a marked increase in torque resulting in jerky operation. Conversely, not energizing the bypass contactor in response to a current limiting condition can have undesirable impact on the operation of the vehicle. For example, a vehicle carrying a large load up an inclined ramp may become stalled and closing the bypass contactors 140,140' is the only means for accelerating the vehicle. Thus, jerky operation may be permissible in certain operating conditions.

During normal operation without current limiting the microprocessor 74 controllably increases the duty cycle of the chopper circuit at a preselected rate. However, when the microprocessor detects current limiting by monitoring the lines 148,148', the rate of increase of the chopper circuit duty cycle is altered. The rate of change is decreased during current limiting to allow the vehicle to further accelerate; however, the bypass contactors 140,140' will still close, but at a time delayed from that of normal operation to allow the vehicle more time to accelerate.

Other aspects, objects and advantages of the present invention can be obtained from a study of the drawings, the disclosure and the appended claims.

We claim:

1. An apparatus for selectively bypassing a power switching element of an electric vehicle drive system to continuously energize an electric motor of the vehicle drive system, the apparatus comprising:
   a bypass contactor connected in parallel with the power switching element;
   means for delivering a signal having a magnitude correlative to a desired duty cycle of the power switching element;
   means for detecting motor current;
   means for delivering a current limit signal in response to the detected current being greater than a preselected setpoint;
   means for receiving the desired duty cycle signal, comparing the desired duty cycle signal to a maximum duty cycle signal, and closing the bypass contactor a preselected duration of time after receiving the desired duty cycle signal having a value equal to the maximum duty cycle signal;
   means for altering the preselected duration of time in response to receiving the current limit signal.

2. An apparatus, as set forth in claim 1, including:
   means for controlling the direction of energization of the motor;
   means for detecting the direction of energization, means for setting the preselected duration of time to a first value in response to the motor being energized for forward rotation, and to a second value in response to the motor being energized for reverse rotation.

3. An apparatus, as set forth in claim 2, wherein the means for setting the preselected duration of time sets the second value to a magnitude substantially greater than the first value.

4. An apparatus, as set forth in claim 1 wherein the altering means increases the preselected duration of time in response to receiving the current limit signal.

* * * * *